United States Patent [19]
Kakalec et al.

[11] Patent Number: 5,612,859
[45] Date of Patent: Mar. 18, 1997

[54] BATTERY POLARITY SWITCH FOR GENERATING LOW FREQUENCY VOLTAGE WAVEFORMS

[75] Inventors: Robert J. Kakalec, Madison, N.J.; Keith C. Schmid, Dallas, Tex.

[73] Assignee: Lucent Technologies Inc., Murray Hill, N.J.

[21] Appl. No.: 435,297

[22] Filed: May 3, 1995

[51] Int. Cl.⁶ ............................. H02J 3/00; H02M 7/02
[52] U.S. Cl. .......................................... 363/34; 363/63
[58] Field of Search .............................. 363/34, 63, 106, 363/41, 98, 132; 307/66

[56] References Cited

U.S. PATENT DOCUMENTS

| | | | |
|---|---|---|---|
| 3,820,006 | 6/1974 | Phillips | 321/45 |
| 4,980,813 | 12/1990 | Wells | 363/134 |
| 5,391,927 | 2/1995 | Kaziwara | 363/49 |
| 5,414,609 | 5/1995 | Levran et al. | 363/35 |

OTHER PUBLICATIONS

"Power Electronics: Converters, Applications, and Design" N. Mohan, T. M. Undeland, W. P. Robbins, pp. 115–117.

*Primary Examiner*—Stuart N. Hecker
*Attorney, Agent, or Firm*—Alfred G. Steinmetz

[57] ABSTRACT

A bipolar switching circuit converts an applied DC voltage to a low frequency AC voltage by periodically transmitting and inverting the applied DC voltage. The bipolar circuitry in one embodiment includes four switches which are switched in pairs to alternately provide a direct transmission of the input DC voltage and an inverted version of the DC input voltage.

9 Claims, 4 Drawing Sheets

BATTERY POLARITY SWITCH FOR GENERATING LOW FREQUENCY VOLTAGE WAVEFORMS

FIELD OF THE INVENTION

This invention relates to apparatus for providing a protected voltage from either an AC line voltage or a DC backup voltage source. It is particularly concerned with a system providing low frequency AC from a primary source to energize a load responsive to AC voltage and to provide the same AC voltage from a reserve source.

BACKGROUND OF THE INVENTION

Previous power systems for providing protected (i.e., uninterrupted) power have generally been designated as either series processing systems or parallel processing systems. In the series processing system the primary AC voltage is rectified into a DC voltage which is applied to float a battery. The DC voltage energizes an inverter connected in series with the rectifier battery combination. DC voltage to the inverter input is continuous from either the battery or rectifier, hence the output voltage is truly uninterrupted. This advantage is counterbalanced by the low efficiency (e.g., 76.5%) of the series protected power system and in addition high cost and large size disadvantages, especially at very low frequencies.

Another widely used protected power system is the parallel processing protected power system. In this system both primary AC voltage and the AC output of a DC voltage (i.e., a battery) powered inverter are coupled to a load, for example, through a transformer with the turns ratio adjusting the voltage to a desired output voltage level. With system components connected in parallel, the resulting operating efficiency is quite high (e.g., 85% to 90%). A critical disadvantage is the time lost (i.e., transfer time) in transferring the load from the primary (i.e., AC line) AC voltage to the (i.e. inverter) reserve AC voltage. Typically the inverter is activated only upon failure of the primary AC voltage and hence load transfer is delayed. Even when the inverter is continuously operating in an idling mode, the transfer time is often unacceptable in communication system applications and system fixes to accommodate this transfer time are expensive. It is further disadvantaged by being operative at line frequency only.

In both instances the large size of the magnetic components at low frequencies makes their use impracticable for most applications and especially for applications operating at low frequencies.

A typical exemplary series processing type protected power system is shown in FIG. 1. AC line power is applied to the input 101 of the bulk and battery charge rectifier package 102 whose output is connected in series to an inverter 103 and is also applied to float the battery 104 supplying reserve energy. The DC voltage of the battery 104 energizes the inverter 103 upon failure of the commercial line AC voltage.

The exemplary parallel processing type protected power system of FIG. 2 applies commercial AC line voltage to two leads 201 and 202 connected in parallel to an AC power conditioner 205, via a transfer switch contact 203, and to a charging circuit 206, respectively. The charging circuit maintains a battery 207, at a float voltage and the battery 207 is connected to the input of an inverter 208 via a transfer switch contact 209. Transfer switch contacts 203 and 209 are controlled by a mechanical transfer switch control 211 which monitors the commercial AC voltage, via lead 212. As long as the AC voltage is satisfactory the switch 203 is closed and switch 209 is open thereby enabling direct application of the AC voltage to the AC power conditioner 205.

The AC power conditioner 205 comprises a ferroresonant transformer with two isolated inputs, one from lead 201 and the other from the inverter 208. The power conditioner may be a ferroresonant transformer which couples AC line energy and inverter output to the AC output 210 which is connected to a load. The AC commercial AC voltage is the primary power source and upon its failure power for the AC load is derived from the battery voltage.

Neither of these two protected power systems is suitable for low frequency power systems (for example one Hertz) which are suitable for certain communication systems. Such low frequencies are advantageous in reducing corrosion in the wire distribution system.

SUMMARY OF THE INVENTION

According to the invention a protected power system is provided as described in the recitations of the claim 1.

In a particular illustrative embodiment, a bipolar switching circuit converts an applied DC voltage to a low frequency AC voltage by periodically transmitting and inverting the applied DC voltage. The bipolar circuitry in one embodiment includes four switches which are switched in pairs to alternately provide a direct transmission of the input DC voltage and an inverted version of the DC input voltage.

In one arrangement the bipolar switching circuit includes a buck regulator in one input lead to the circuit and in another arrangement two buck regulators replace two alternately operating switches, of the four.

In another arrangement the change of polarity of the output wave form is controlled by a slew rate control.

DETAILED DESCRIPTION

Figure 1:
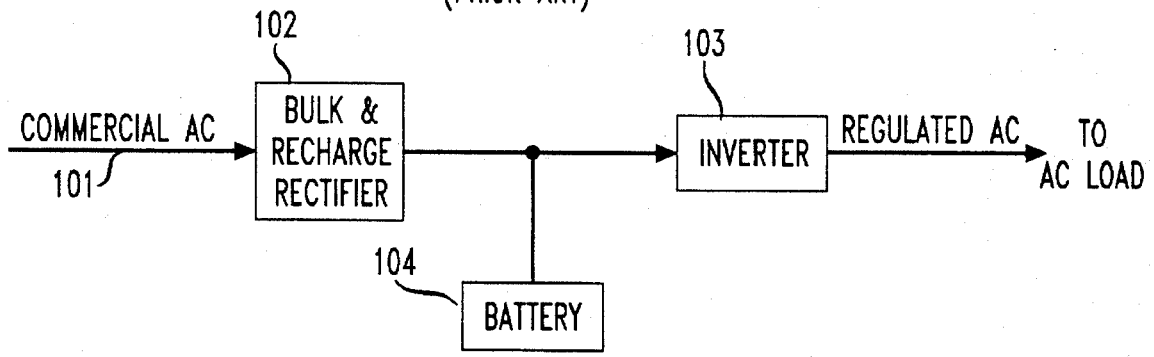
FIG. 1 is a schematic of a prior art series type protected power system.
Figure 2:
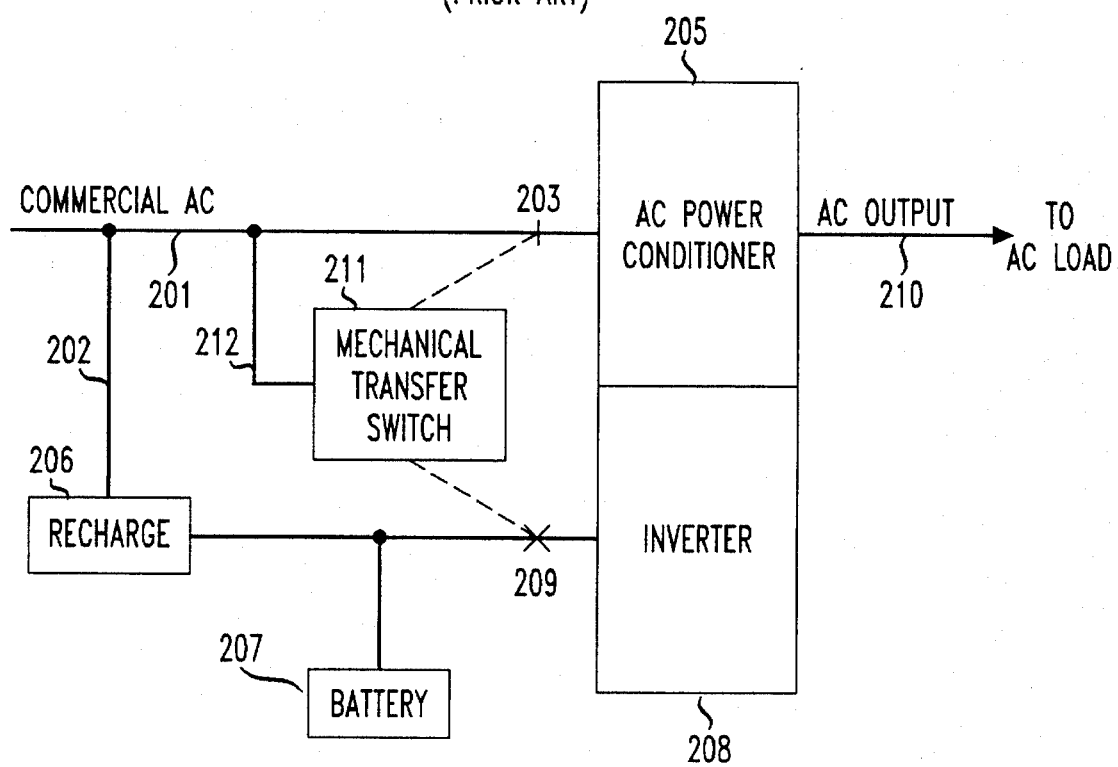
FIG. 2 is a schematic of a prior art parallel type protected power system.
Figure 3:
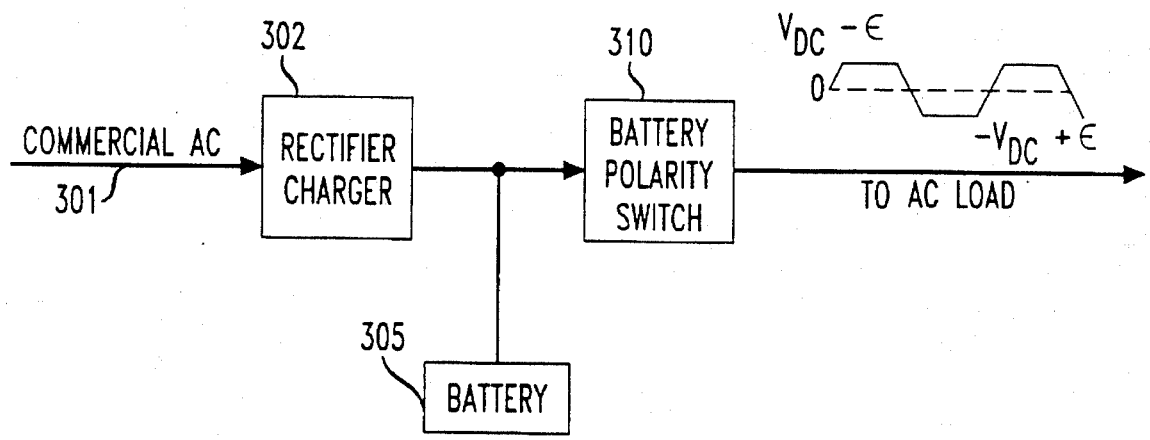
FIG. 3 is a schematic of a battery plant protected power system according to the invention.

A protected power system for providing uninterrupted power, embodying the principles of the invention, is shown in the FIG. 3. AC commercial voltage is applied to a rectifier charger 302 via input lead 301. A battery 305, supplying reserve energy, is floated off the DC output voltage of the rectifier charger and this rectified DC voltage is applied to a battery polarity switch 310. Battery polarity switch 310 is a power switching circuit that periodically inverts the applied DC voltage to alternate positive and negative DC voltage levels having a magnitude slightly less than the rectified DC voltage level. Hence the rectified voltage must be selected to be greater than the desired output voltage by a small amount. If the battery voltage is considerably higher than the desired output voltage, a buck regulator can be incorporated in the battery polarity switch either in place of the switches 401 and 403 (i.e., for example); or connected in series with the input of the bipolar switch. The buck regulator is chosen for illustrative purposes because of its small size and its high operating efficiency.

Figure 4:
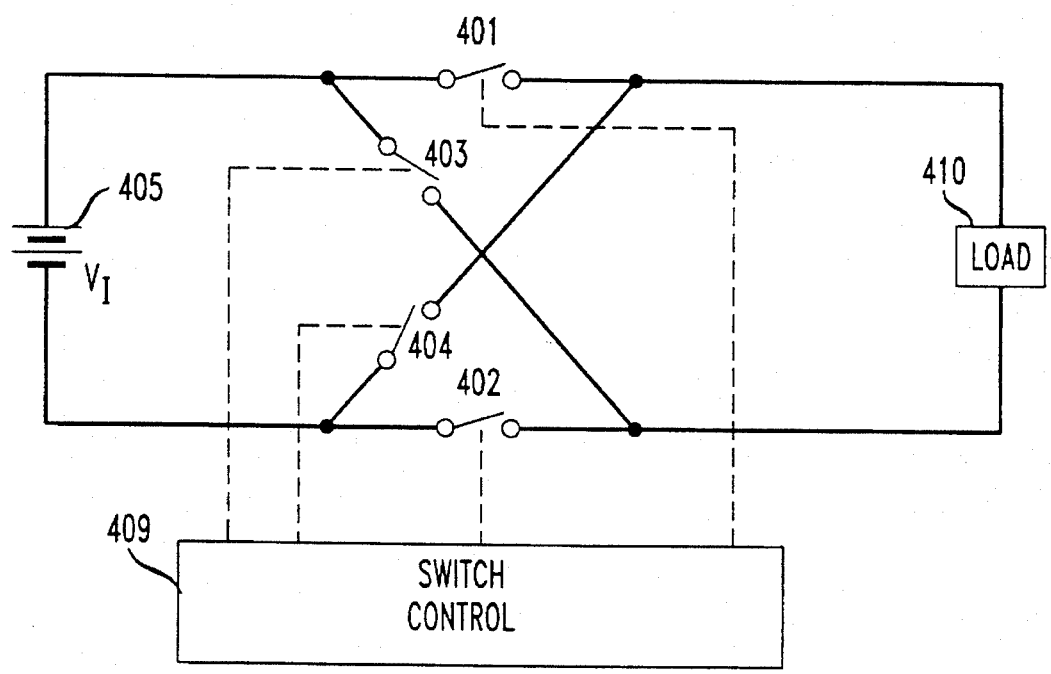
FIG. 4 is a schematic of a battery polarity switch according to the invention.

The switching arrangement is shown in FIG. 4 and as shown includes no magnetic components in the power train. This elimination of reactive energy storage components insures a high efficiency of the switching circuit which in the illustrative embodiment attains efficiencies of 98%. The use of the bipolar switch further results in size and cost efficiencies.

A bipolar switch, as shown in the schematic of FIG. 4, includes four controllable switch devices 401, 402, 403 and 404 connected to transmit and invert a DC voltage supplied by the DC voltage source 405 which is applied to energize the load 410. DC voltage source may be either the DC voltage output of the rectifier 302 or the battery voltage of battery 305 (shown in FIG. 3). Load 410 is an electrically energized load which may operate off of a DC voltage or a low frequency AC voltage (i.e., one Hertz of less). Such loads may comprise amplifier circuits such as used in communication systems.

Figure 5:
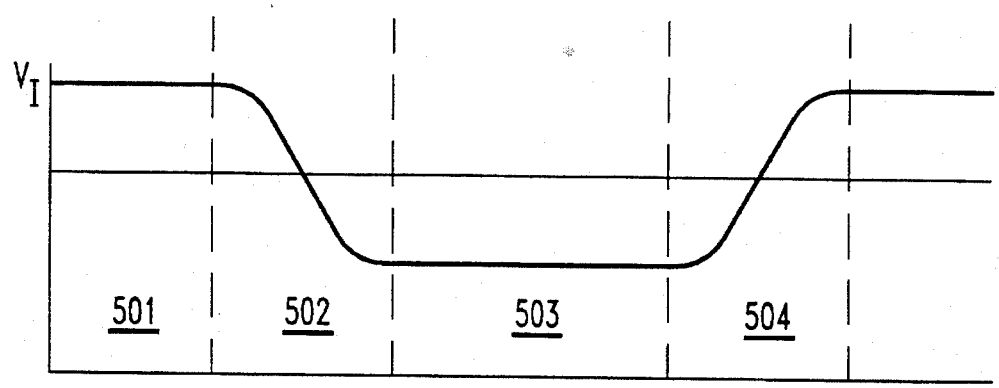
FIG. 5 is a graph of a voltage waveform of the output of the battery polarity switch of FIG. 4.

The switches 401 through 404 have their conductivity controlled by a switch control 409 which supplies the periodic control signals to control the switches. In the illustrative scheme the switches 401 and 402 are closed in a first time interval 501 as shown in FIG. 5 while switches 403 and 404 are open. In a subsequent time interval 502 the switches 401 and 402 are biased open while switches 403 and 404 are being biased into conductivity. By the advent of the interval 503, the switches 401 and 402 are non-conducting and open while the switches 403 and 404 are fully conducting. In the subsequent time interval 504 the switches 401 and 402 are being controllably closed or biased into conduction while the switches 403 and 404 are opened or biased non-conducting. By time interval 505 switches 403 and 404 are non-conducting while switches 401 and 402 are fully conducting.

As is apparent the switching of switches 401 through 404 as described produces a substantially trapezoidal waveform whose peak magnitudes is the input DC voltage minus the component voltage drops. At the start of the cycle (i.e., time interval 501), when the switches 401 and 402 are conducting and the switches 403 and 404 are non-conducting the DC voltage designated $V_{DC}$ minus $\epsilon$ is applied to the load 410. During the interval 502 the switches 401 and 402 are biased non-conducting while the switches 403 and 404 are controllably biased conducting to provide a finite fall time of the voltage from $V_{DC}-\epsilon$ to $V_{DC}+\epsilon$ during interval 502. During the interval 503 the switches 403 and 404 are fully conducting and the load voltage is—$V_{DC}+\epsilon$. The cycle is completed when switches 401 and 402 are controllably closed and switches 403 and 404 are opened in interval 504.

Figure 6:
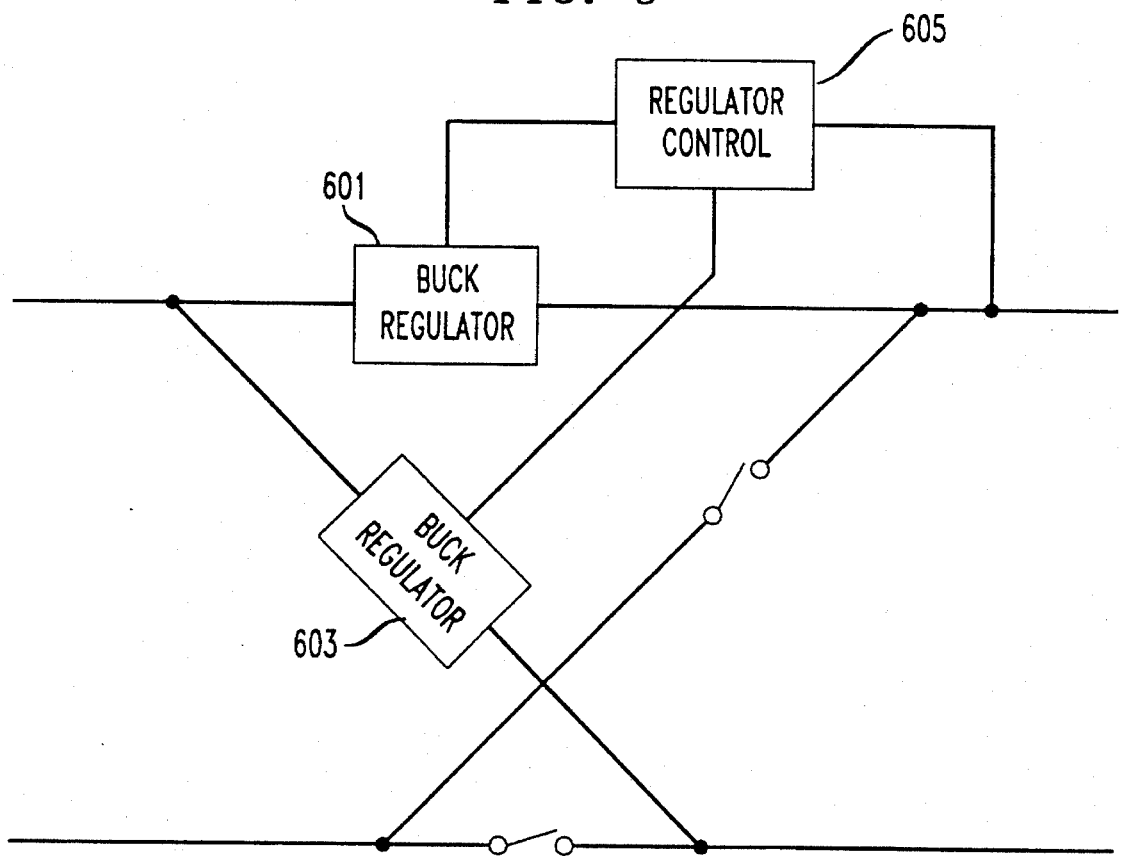
FIGS. 6 and 7 are schematics of an application of a buck regulator circuit to the battery polarity switch of FIG. 4.
Figure 7:
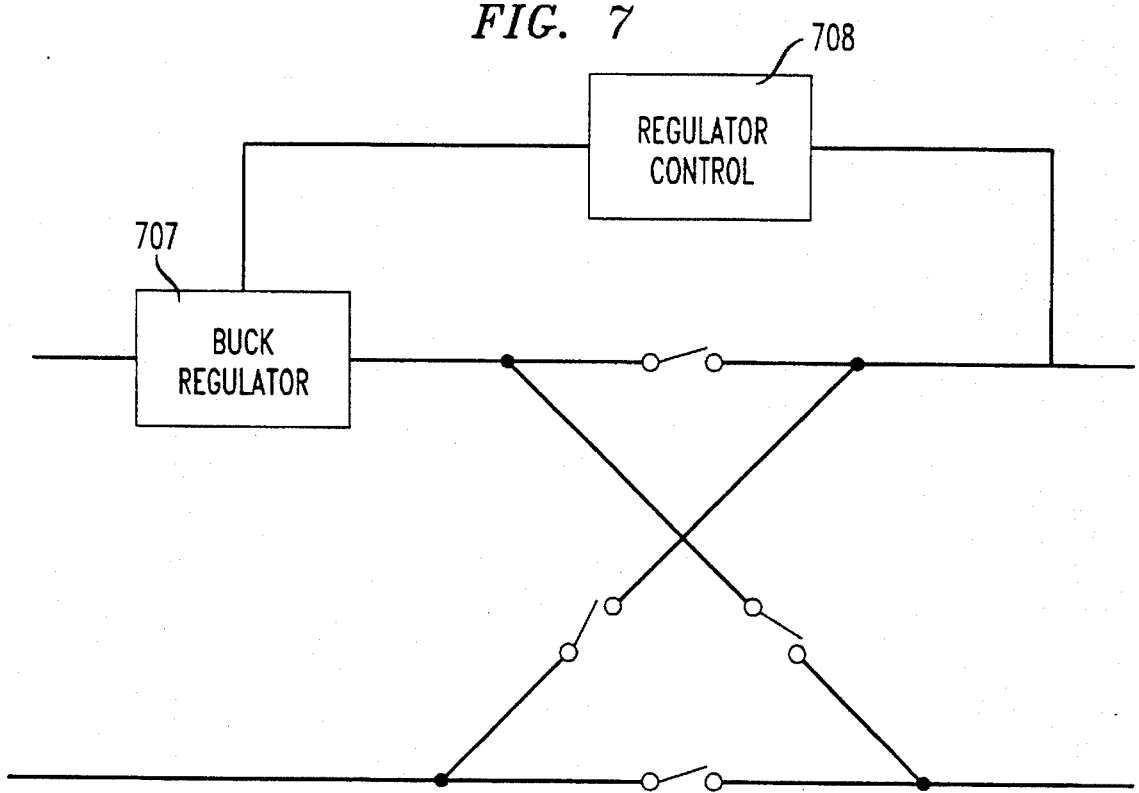

Application of a buck regulator permits precise regulation of the DC voltage applied to the load or output. The buck regulators 601 and 603 replace two switches 401 and 403, as shown in FIG. 6, and are controlled by the regulation control 605. A single buck regulator 707 may be inserted in the input line prior to the switches as shown in the FIG. 7 and is controlled by the regulation control 708.

Figure 8:
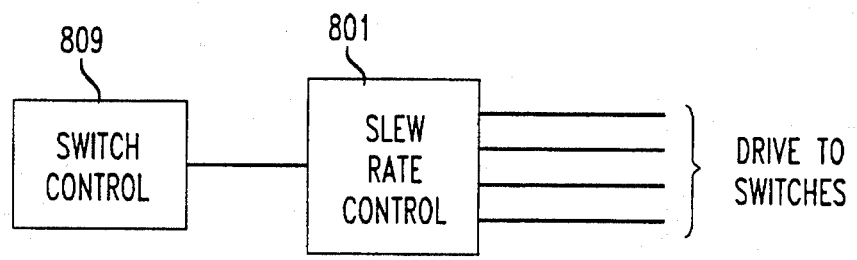
FIG. 8 is a schematic of a control circuit of FIG. 4 to which a slew control has been added.

One arrangement to control the fall and rise time between the alternate polarities is to use a slew rate control 801, which as shown in FIG. 8 modifies the output of the switch control 809. The slew rate control 801 controls the rise and fall rate of the bias voltages supplied to the switches. In the illustrative embodiment the switches could be FET devices whose conductivity is responsive in its active range to the magnitude of the applied bias voltage. When the full voltage has been reached the FET devices are operated in their full conducting state at which their conducting path impedance is very low.

Among the many advantages of the bipolar switching arrangement are its low cost, small size and high operating efficiency. This high efficiency allows the handling of high power levels without requiring forced air cooling or the use of forced air cooling to reduce circuit size. The lack of magnetic components allows the circuit to operate at low AC frequencies (e.g., 1 Hertz) and at DC. Transfer from the rectifier output to the battery DC voltage is substantially instantaneous and the output of the battery polarity switch is uninterrupted.

We claim:

1. A power system for providing uninterruptible, low frequency AC power, comprising:

an input for accepting an AC voltage;

a rectifier for rectifying the AC voltage and supplying a DC voltage at the rectifier terminal;

means for supplying a reserve energy voltage at the rectifier terminal;

an output for accepting a load to be energized by low frequency AC voltage;

a bipolar switching circuit connecting the input to the output having a first pair of switches to couple the DC voltage to the load through an output and return lead and a second pair of switches for supplying an inverter version of the DC voltage to the load through the out and return leads; and switch control circuitry for periodically switching the first and second pair of switches alternately conducting and non-conducting at low frequency, wherein the first and second pair of switches do not include magnetic electrical components, the first and second pair of switches are directly connected to the output, and the power system does not include magnetic electrical components electrically connected to the output.

2. A power system for providing uninterruptible power as claimed in claim 1, wherein one switch of the first pair of switches includes a first buck regulator and one switch of the second pair of switches includes a second buck regulator.

3. A power system for providing uninterruptible power as claimed in claim 1 further including circuitry for controlling a rise and fall time of the voltage output of the switch control and which are applied to the first and second pairs of switches.

4. A power system for providing uninterruptible power as claimed in claim 1 wherein a buck regulator is inserted in the input line to the first and second pairs of switches.

5. A power system for providing uninterruptible power to a load, comprising:

an input for accepting a DC voltage;

an output for accepting a load to be energized by a low frequency AC voltage of less than 60 Hertz;

a polarity switching circuit interconnecting the input and the output, and including;

first and second switched paths connecting the input DC voltage to the output with its applied polarity intact and with the first switched path connecting a first terminal of the DC voltage input to a first terminal of the output and the second switched path connecting a second terminal of the DC voltage input to a second terminal of the output; third and fourth switched paths connecting the input DC voltage to the output with its applied polarity inverted and with the third switched path connecting the first terminal of the DC voltage input to the second terminal of the output and the fourth switched path connecting the second terminal of the input DC voltage to the first output terminal;

a control circuit for controlling the first, second, third and fourth switching paths by application of bias signals;

a slew rate control connected to the control circuit for controlling rise and fall rates of the bias signals; and regulation circuitry for regulating voltage levels traversing the first and third switched paths, wherein the first, second, third and fourth switch paths do not include magnetic electrical components, the first, second, third and fourth switch paths are directly connected to the output, and the power system does not include magnetic electrical components electrically connected to the output.

6. A power system for providing uninterruptible power to a load, as claimed in claim 5, wherein the regulation circuit comprises a buck regulator connected in series with the first and third switch path.

7. A power system for providing uninterruptible power to a load, as claimed in claim 5, wherein the regulation circuit comprises a first buck regulator connected in one of the first and second switch paths and a second buck regulator connected in one of the third and fourth switch paths.

8. A method for providing uninterruptible, low frequency AC power comprising:

providing an input for accepting an AC voltage, a rectifier for rectifying the AC voltage and supplying a DC voltage at the rectifier terminal, means for supplying a reserve energy voltage at the rectifier terminal, providing an output for accepting a load to be energized by low frequency AC voltage, providing a bipolar switching circuit connecting the input to the output having a first pair of switches to couple the DC voltage to the load through an output and return lead and second pair of switches for supplying an inverter version of the DC voltage to the load through the out and return leads, providing switch control circuitry for periodically switching the first and second pair of switches alternately conducting and non-conducting, and periodically switching the first and second pair of switches alternately conducting and non-conducting at low frequency to provide uninterruptible low frequency AC power.

9. The method according to claim 8, wherein at least one of the first pair of switches comprises a buck regulator and at least one of the second pair of switches comprises a buck regulator.

* * * * *